United States Patent
Biedrzycki

(10) Patent No.: US 9,216,654 B2
(45) Date of Patent: Dec. 22, 2015

(54) ELECTRIC VEHICLE CHARGING STATION WITH RECONFIGURABLE ELECTRICAL INSTALLATION OPTIONS AND METHODS

(71) Applicant: Timothy Biedrzycki, Powder Springs, GA (US)

(72) Inventor: Timothy Biedrzycki, Powder Springs, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 172 days.

(21) Appl. No.: 13/964,145

(22) Filed: Aug. 12, 2013

(65) Prior Publication Data

US 2015/0042276 A1    Feb. 12, 2015

(51) Int. Cl.
*H02J 7/00*    (2006.01)
*B60L 11/18*    (2006.01)

(52) U.S. Cl.
CPC ......... *B60L 11/1809* (2013.01); *B60L 11/1818* (2013.01); *B60L 11/1824* (2013.01); *B60L 11/1825* (2013.01); *B60L 11/1838* (2013.01)

(58) Field of Classification Search
CPC ........... H02J 5/005; H02J 17/00; H02J 7/025; H02J 7/35; H02J 7/00; H02J 7/0027; H02J 7/0029; H02J 7/0047; H02J 2007/0062; H02J 7/0055; Y02T 90/122; Y02T 90/121; Y02T 10/7088; Y02T 10/7055
USPC .................................................. 320/106–112
See application file for complete search history.

(56) References Cited

U.S. PATENT DOCUMENTS

| | | |
|---|---|---|
| 2011/0037429 A1 | 2/2011 | Cowans |
| 2013/0020990 A1* | 1/2013 | DeBoer et al. ................ 320/109 |
| 2013/0020991 A1 | 1/2013 | Biedrzycki |
| 2013/0021162 A1* | 1/2013 | DeBoer et al. ................ 340/635 |

* cited by examiner

*Primary Examiner* — Binh Tat

(57) ABSTRACT

An electric vehicle charging apparatus is disclosed. The electric vehicle charging apparatus has a housing having a front cavity, rear cavity, and a separating wall having a common electrical passage, wherein the rear cavity is formed by sidewalls with one sidewall having a slot formed therein. A power cord passes through the common electrical passage in the separating wall, and the power cord is configurable to provide a number of electrical connection options, such as an "outside cord option" and a "rear mount option." Methods of configuring the electric vehicle charging apparatus are provided, as are other aspects.

16 Claims, 8 Drawing Sheets

ELECTRIC VEHICLE CHARGING STATION WITH RECONFIGURABLE ELECTRICAL INSTALLATION OPTIONS AND METHODS

FIELD

The present invention relates generally to apparatus, systems and methods adapted to electrically charge electric vehicles, and in particular to electric vehicle charging apparatus and installations.

BACKGROUND

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines are considerably less efficient. EVs emit no tailpipe pollutants when operating in battery mode. Electric motors provide quiet, smooth operation, strong acceleration and may require relatively low maintenance.

However, most current EVs can only go about 100-200 miles before requiring electrical recharging. EV charging may take place using an electric vehicle charging station, sometimes referred to as electric vehicle supply equipment (EVSE). Such electric vehicle charging stations may be installed at the residence (e.g., in a garage), on an outside wall, or on a post or other structure, and may be electrically coupled to an electrical load center of the residence. Existing EVSEs may be generally quite difficult to install and are difficult to adapt to various installations.

Therefore, there is a need for simple, cost effective, and easy-to-install EVSEs, as well as improved methods for installing such electric vehicle charging stations.

SUMMARY

According to a first aspect, an electric vehicle charging apparatus is provided. The electric vehicle charging apparatus includes a housing having a body having a front cavity having at least one electrical terminal, a rear cavity formed by sidewalls, at least one sidewall having a slot formed therein, a separating wall separating the front cavity and rear cavity and having a common electrical passage through the separating wall, and a power cord having a cord length, the power cord connected through the common electrical passage, wherein the cord length is configurable to provide one installation option selected from a group consisting of: an outside cord option wherein a portion of the cord length extends through the slot to a position outside of a footprint of the body and is adapted to electrically connect to an first electrical article located outside of the footprint, and a rear mount option wherein a portion of the cord length is received in the rear cavity and is adapted to electrically connect to an second electrical article located inside of the footprint of the body.

According to another aspect, an electric vehicle charging apparatus installation is provided. The electric vehicle charging apparatus installation includes a housing having a body with a front cavity, a rear cavity formed by sidewalls, wherein at least one of the sidewalls has a slot through, a separating wall separating the front cavity having a common electrical passage, an electrical terminal in the front cavity; a common electrical pass-through connector received in the common electrical passage; a power cord having a cord length and an electrical plug at a terminal end, the power cord connected through the common electrical pass-through connector and electrically connected to the electrical terminal in the front cavity, wherein the cord length and electrical plug are configurable to provide a plurality of electrical installation options, selected from a group consisting of: an outside cord option wherein a portion of the cord length passes through the slot and the electrical plug is configured and adapted to electrically connect to an electrical receptacle located outside a footprint of the body, and a rear mount option wherein the cord length and electrical plug are received in the rear cavity and are configured and adapted to electrically connect to a electrical receptacle located inside of the footprint of the body.

According to another aspect, a method of configuring an electric vehicle charging apparatus is provided. The method includes providing a housing having a body with a front cavity, a rear cavity formed by sidewalls, at least one sidewall having a slot formed therein, a separating wall separating the front cavity and rear cavity and having a common electrical passage through the separating wall, at least one electrical terminal in the front cavity, and a power cord having a cord length, the power cord connected through the common electrical passage; and configuring the cord length to provide an electrical installation option, selected from a group consisting of: an outside cord option wherein a portion of the cord length extends through the slot to a position outside of a footprint of the body and is configured to electrically connect to a first electrical article located outside of the footprint, and a rear mount option wherein the cord length is received in the rear cavity and is configured to electrically connect to a second electrical article located inside of the footprint of the body.

Still other aspects, features, and advantages of embodiments of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Reference will now be made in detail to the example embodiments of which are illustrated in the accompanying drawings. Wherever possible, the same reference numbers will be used throughout the drawings to refer to the same or like parts.

The aforementioned problems of difficulty in installing the electric vehicle charging apparatus are overcome by one or more embodiments of the present invention. In particular, in a first aspect, power cord configuring options are provided that make the electric vehicle charging apparatus easier to install in the field. According to one aspect of the present invention, an outside mount option and rear-mounted option may be provided with a common power cord. Accordingly, an installer may easily configure the electric vehicle charging apparatus as a rear mount configuration option or an outside mount configuration option by using a common housing configuration and a common internal power cord pass through. In one embodiment, the electric vehicle charging apparatus may be configured as either a rear mount configuration or an outside mount configuration without a need to redo gaskets, seals, or any other aspect of the apparatus.

In one or more embodiments, the electric vehicle charging apparatus includes housing structural features and an electrical power cord allowing the electric vehicle charging apparatus to be installed in either of an "outside cord option" or in a "rear mount option." The "outside cord option" has an outside cord that is configured to be electrically-connected to a first electrical article (e.g., into an electric receptacle, load center panel or sub-panel, or gang box) that is located adjacent to an exterior of the electric vehicle charging apparatus and outside of the footprint of the electric vehicle charging apparatus. In the "rear mount option," the electric vehicle charging apparatus includes housing structural features and cord configuration enabling rear mounting wherein the electric vehicle charging apparatus is plugged into a second electrical article (e.g., an electrical receptacle or gang box) located behind the electric vehicle charging apparatus and within the footprint of the electric vehicle charging apparatus, such that it is able to hide the power cord and second electrical article.

These flexible electrical configuration options offer a homeowner and/or installer more flexibility when installing or retrofitting an electric vehicle charging apparatus into existing electrical power architecture.

Embodiments of the invention will be explained in greater detail with reference to FIGS. 1-6 herein.

Figure 1:
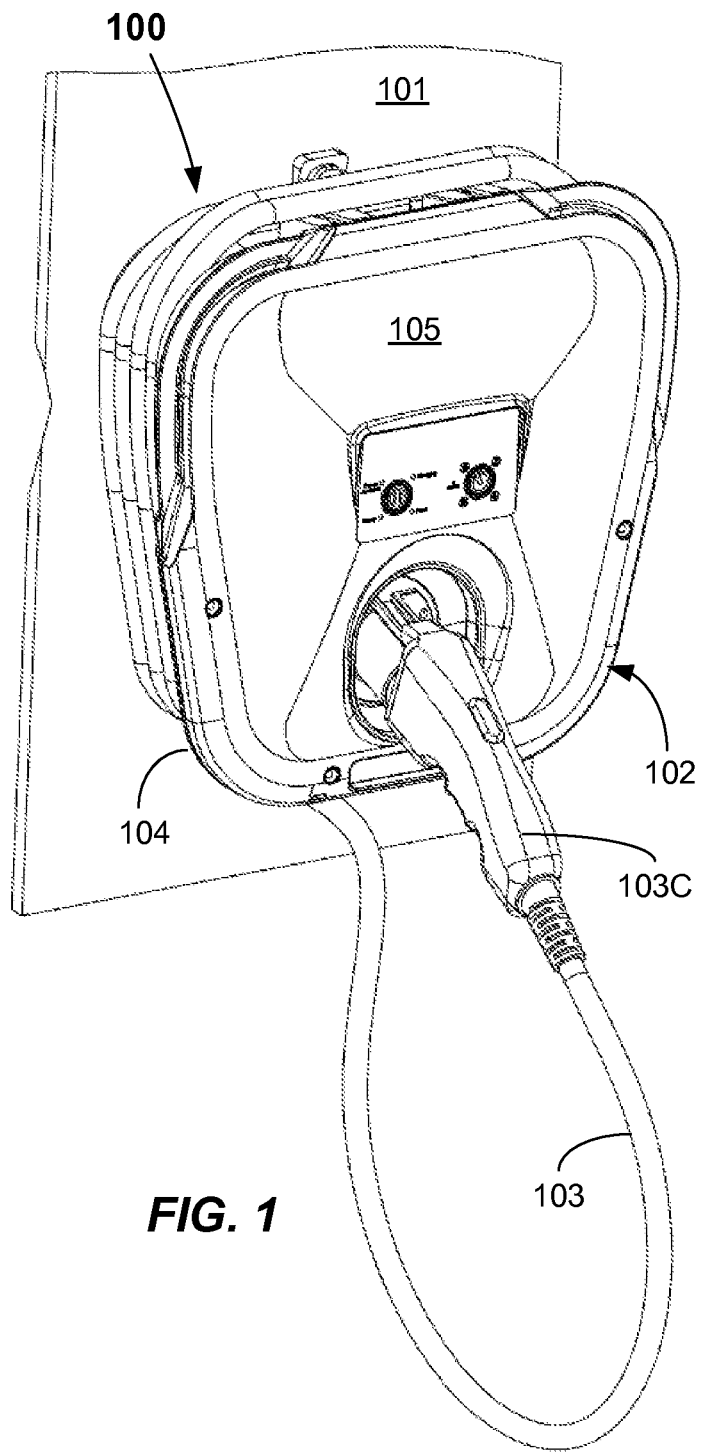
FIG. 1 illustrates a front isometric view of an electric vehicle charging apparatus configured in a rear mount configuration option according to embodiments.

FIG. 1 illustrates an embodiment of an electric vehicle charging apparatus 100 adapted to be mounted to a structure, such as a room wall. The electric vehicle charging apparatus 100 receives electrical power from an electrical power supply system by connection to an electrical article (e.g., an electrical receptacle, gang box, load center panel or sub-panel) or the like. Electric vehicle charging apparatus 100 is adapted to charge an electric vehicle such as is described in US2013/0021162, for example. The electric vehicle charging apparatus 100 includes a housing 102, which may be a multi-piece housing, and which may be configured to allow electrical connection to an electrical article in multiple configuration options. The housing 102 may be mounted to any structure 101 such as a wall, stud, post, pedestal, or the like having an electrical receptacle thereon. Multiple electrical connection options may be used, as will be described herein.

The housing 102 may have a body 104 and may have a lid 105 coupled to, and possibly removable from, the body 104. The lid 105 may be removable and may be hinged by one or more hinges to the body 104, such as at a top thereof. The lid 105 may include a latch or other securing features, such as one or more fasteners (e.g., screws) to fasten the lid 105 to the body 104.

The electric vehicle charging apparatus 100 includes a charging cable 103 electrically coupled to the electrical power charging components in the housing 102 and an electrical connector 103C that is adapted to couple to a mating connector located on an electric vehicle (EV). In the depicted embodiment, the electrical connector 103C may be mounted for easy access on a front mounting post formed on the housing 102, such as on the lid 105 thereof. Other mounting options are possible. The housing 102 may have a suitable shape such that the charging cable 103 may be wrapped about a periphery of the housing 102 one or more times and may include a housing lip that is adapted to provide a channel in conjunction with the structure 101 to retain the charging cable 103 within bounds, much like a hose reel. The body 104 may be made of a plastic material, such as a highly flame-retardant plastic material (e.g., a glass-filled, highly flame-retardant polyester material). Other suitable highly flame-retardant materials may be used. In one or more embodiments, the lid 105 may also be made from a highly flame-retardant material as discussed above. Other suitable materials may be used.

The one or more hinges may allow relatively free rotation of the lid 105 relative to the body 104, and may include a suitable mechanism (not shown) for locking the lid 105 in an opened position. A suitable flexible seal may be provided around the periphery or the body 104 or the lid 105 and located at the intersection thereof in order to seal the internal portions and cavities of the electric vehicle charging apparatus 100 such that outside use, i.e., exposure to rain and weather, is possible.

Figure 2:
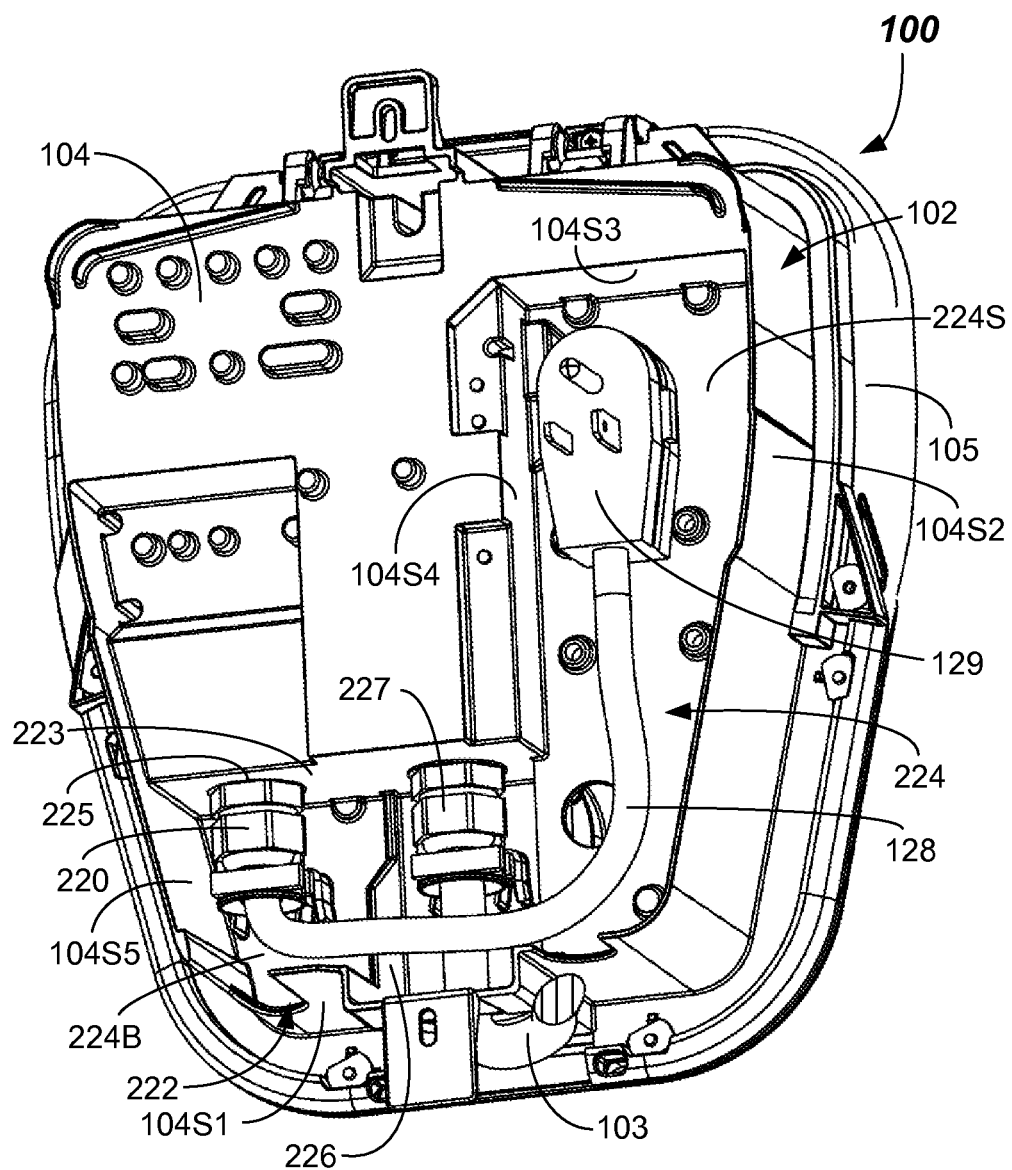
FIG. 2 illustrates a rear isometric view of an electric vehicle charging apparatus configured in a rear mount configuration option according to embodiments.
Figure 3:
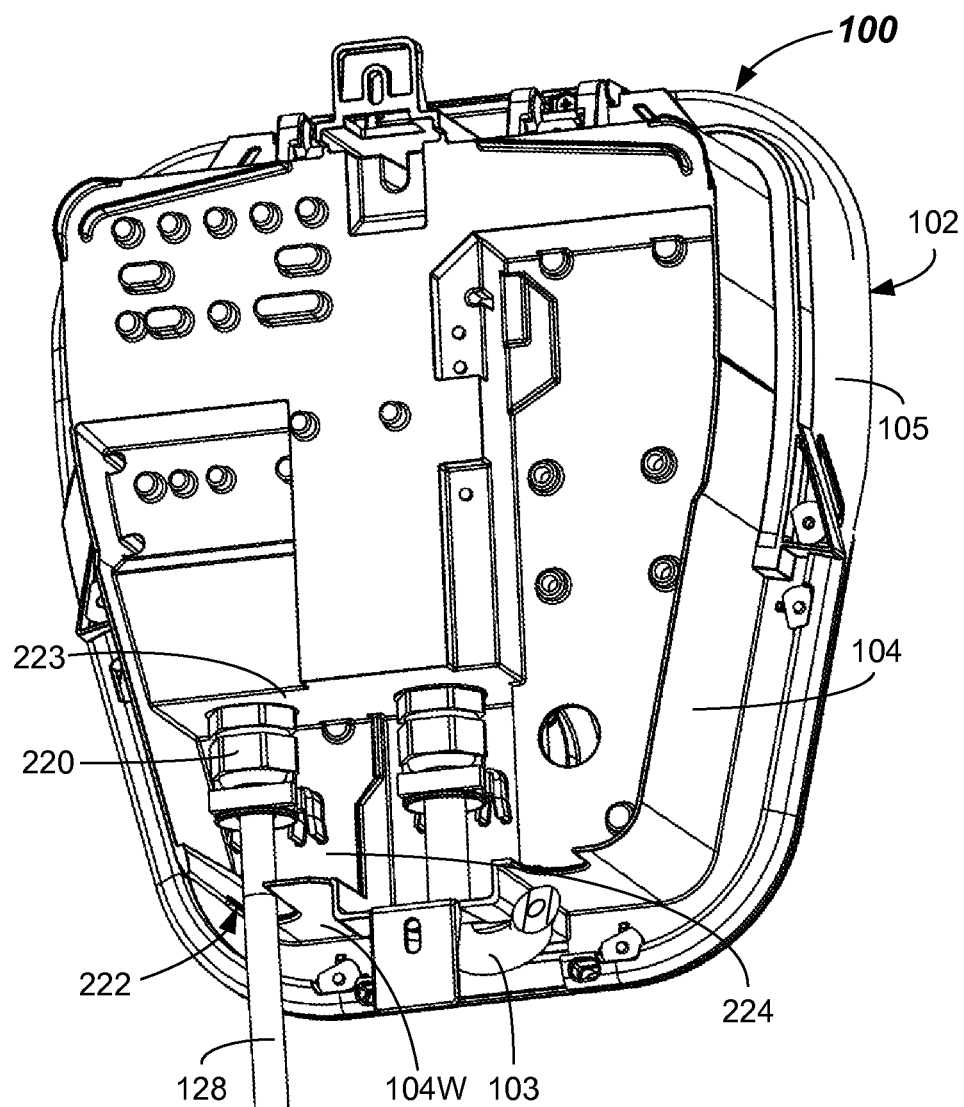
FIG. 3 illustrates a rear isometric view of an electric vehicle charging apparatus configured in an outside mount configuration option according to embodiments.
Figure 3:
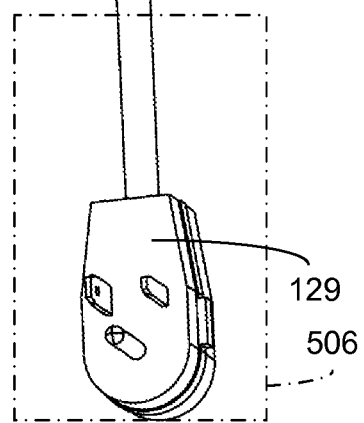
Figure 5A:
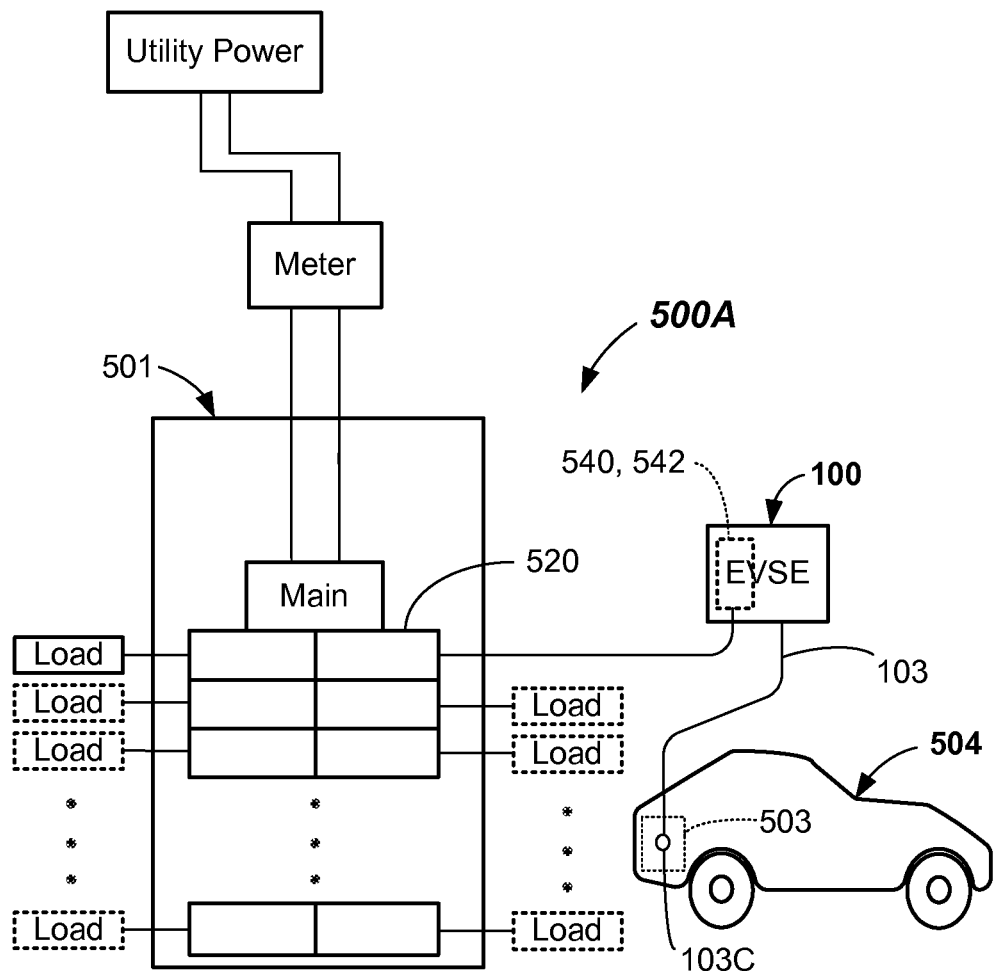
FIG. 5A illustrates a schematic diagram of a rear mount option of an electric vehicle charging apparatus according to embodiments.
Figure 5B:
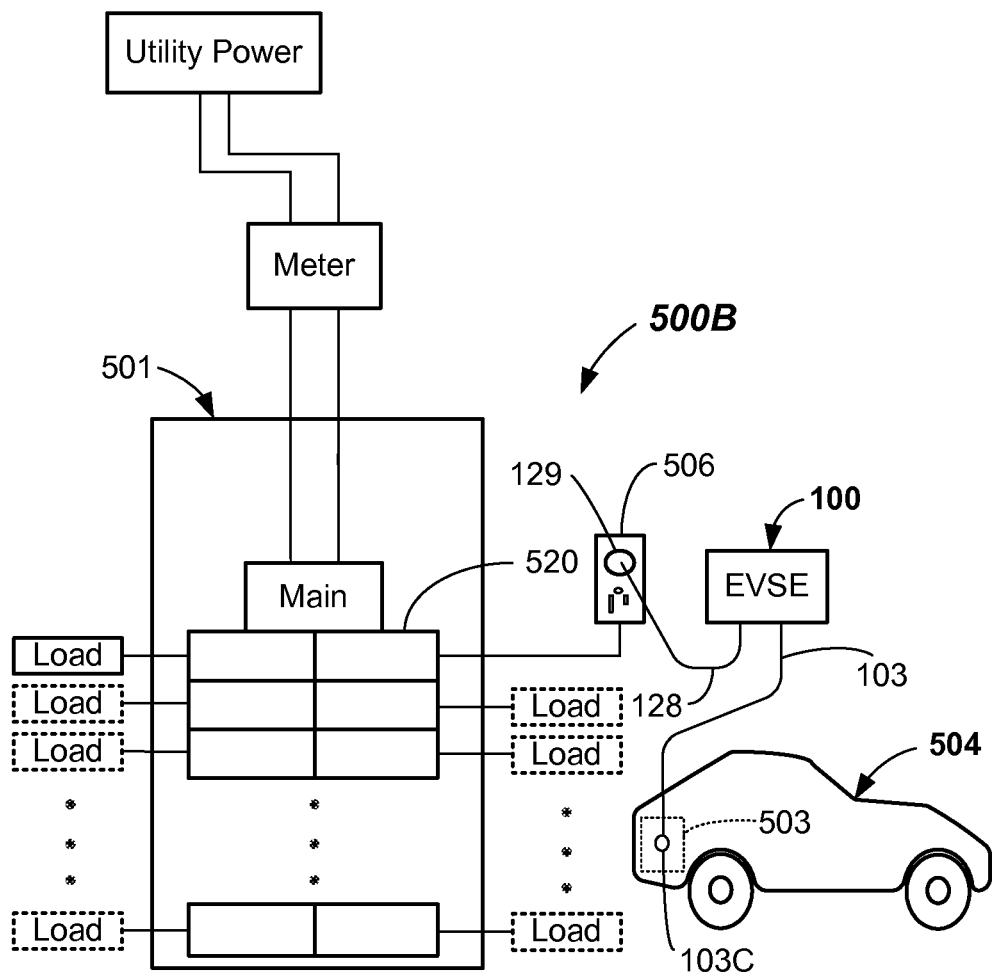
FIG. 5B illustrates a schematic diagram of an outside mount option of an electric vehicle charging apparatus according to embodiments.

Various electrical installations of the electric vehicle charging apparatus 100 may be achieved according to one or more embodiments of the invention. Several installation embodiments are shown in FIGS. 2 and 3 and in FIGS. 5A and 5B herein. As installed, the electric vehicle charging apparatus 100 may be one of the electrical loads that are electrically connected to the electrical supply system (e.g., electrical supply systems 500A-500B as shown in FIGS. 5A and 5B). The number of loads may be as many as allowed by the load center panel 501, and/or any sub-panel electrically coupled thereto. Each electrical load may be protected by its own circuit breaker, and such circuit breakers may have amperage ratings of between about 10 A and about 125 A, for example. One of the electrical circuit branches may include an electrical load, which is the electric vehicle charging apparatus 100. In most installations, the electric vehicle charging apparatus 100 will be the only load on that branch.

The electric vehicle charging apparatus 100 is adapted to supply an electrical current output to charge an electrical power source 503 (e.g., a battery pack) of an EV 504 as shown in FIGS. 5A-5B. In the depicted embodiments herein, the charge may be at about 220V. The power may be supplied to the EV 504 by the charging cable 103 having the electrical connector 103C electrically coupling to a receiving connector on the EV 504.

The electric vehicle charging apparatus 100, as shown in FIG. 5A may include an "rear mount option" and may be interconnected to a circuit breaker 520 in a load center panel 501, or to a sub-panel (not shown) electrically coupled to the load center panel 501, through an electrical article such as an electrical receptacle 540 or gang box 542. Thus, in one embodiment, the electric vehicle charging apparatus 100 may be plugged directly into an electrical receptacle 540 that is electrically coupled to the circuit breaker 520. In another embodiment, the electric vehicle charging apparatus 100 may be wired directly into a gang box 542 behind the electric vehicle charging apparatus 100 that is electrically coupled to the circuit breaker 520.

As shown in FIG. 2, the electric vehicle charging apparatus 100 may include an power cord 128 and an electrical plug 129, such as a 240V NEMA plug. Other plugs may be used. Thus, in this embodiment, the electric vehicle charging apparatus 100 is wired as a "rear mount option" and powered through the power cord 128 and electrical plug 129. In this rear mount option, the electric vehicle charging apparatus 100 is electrically connected to an electrical receptacle 540 (see FIG. 5A) located directly behind the electric vehicle charging apparatus 100, i.e., within the footprint of the electric vehicle charging apparatus 100. As such, the electrical receptacle 540 and the power cord 128 and electrical plug 129 are hidden from view as is shown in FIG. 1.

FIG. 3 illustrates an outside cord option configuration. The term "outside" as used herein denotes a position outside of a footprint of the electric vehicle charging apparatus 100, i.e., external to, but not behind the electric vehicle charging apparatus 100. For example, in the outside cord option configuration, the electric vehicle charging apparatus 100 may electrically connect to an electrical receptacle 506 (see FIG. 5B) mounted below, above, or to a side of the electric vehicle charging apparatus 100. In the outside cord option, the power cord 128 extends through a sidewall 1045I of the body 104 and is provided external to the body 104. The exit may be through a slot 222. In other embodiments, the outside mount may be to a load center panel or sub-panel. In these outside mount option configurations, the power cord may pass through a conduit that may couple to the slot 222 and also to a side, bottom, or top of the load center panel or sub-panel side.

Figure 4A:
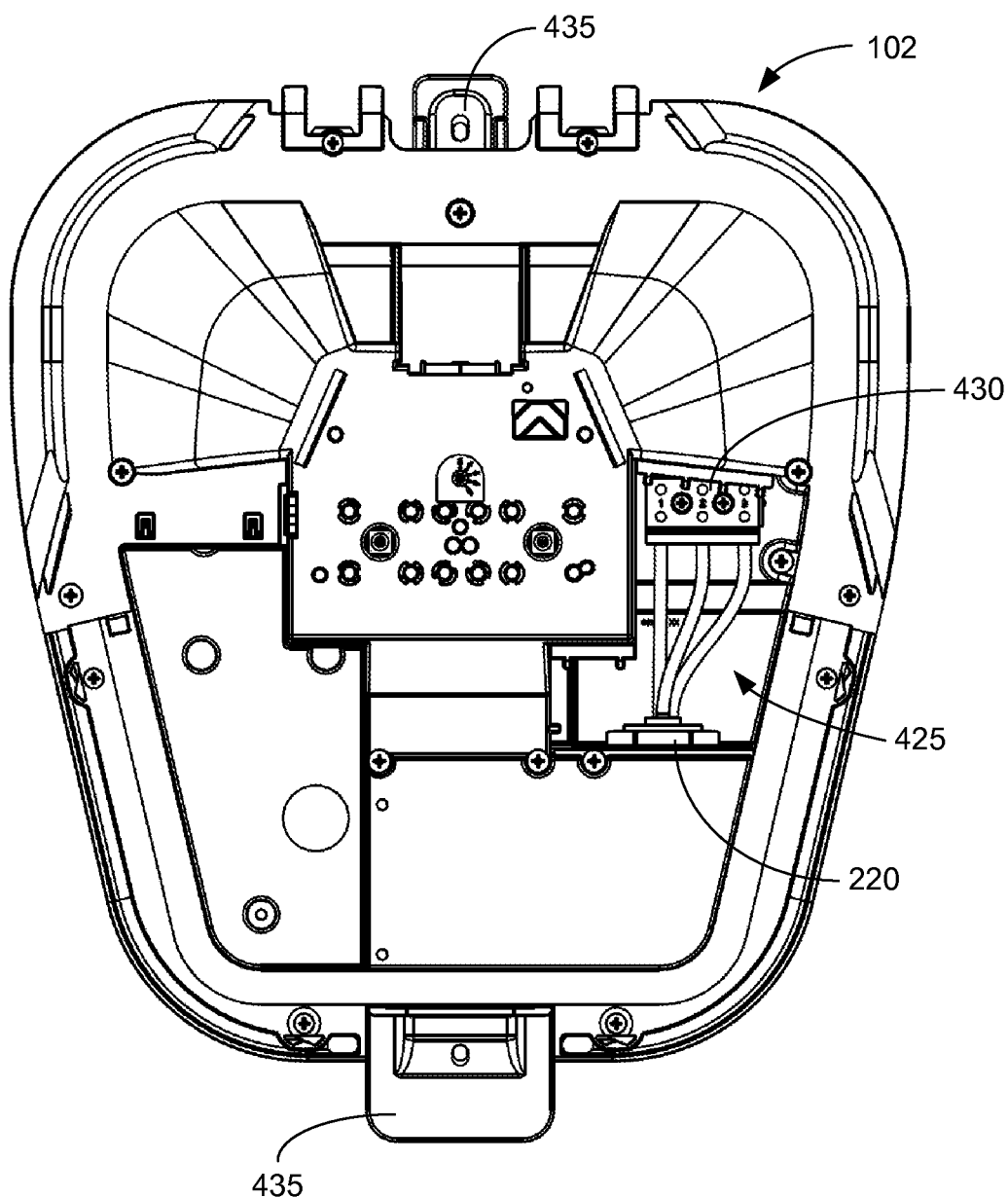
FIG. 4A illustrates a front plan view of an electric vehicle charging apparatus showing an electrical connection to an electrical terminal in a front cavity according to embodiments.
Figure 4B:
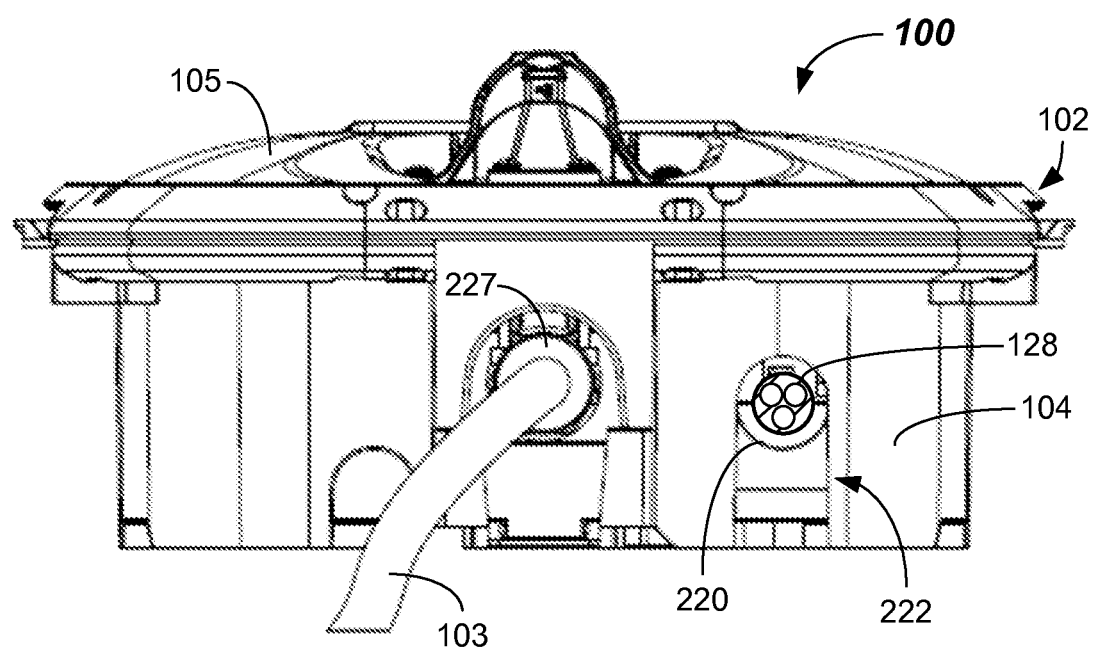
FIG. 4B illustrates a bottom plan view of an electric vehicle charging apparatus showing a slot through the sidewall of the rear cavity according to embodiments.

In each embodiment shown in FIGS. 2 and 3, a single electrical pass through connector 220 may be provided, which may be a sealed pass through connector. The single electrical pass through connector 220 allows electrical power to pass through from a rear cavity 224 through into the front cavity 425 as shown in FIG. 4A, where the wires of the power cord 128 may connect to electrical terminals 430. The electrical terminals 430 may be a lug, lug assembly, quick connect, terminal block, or the like. In the depicted embodiment, a terminal block is shown. Other suitable electrical terminal options may be used. Pass-through connector 220 may connect to a passage formed in a separating wall 223 of the body 104. The rear cavity 224 may include a bottom portion 224B and a side portion 224S formed by sidewalls 1045I through 1045S. Bottom portion 224B may be deeper than the side portion 224S.

Thus, in the embodiments of FIGS. 2 and 3 described herein, the body 104 is structurally configured with a common wiring passage 225 into which the pass-through connector 220 is received. From this, the cord length of the power cord 128 may be configured to provide a plurality of electrical power connection configuration options. In the plurality of electrical power connection options, the power cord 128 is connected through the common electrical passage (e.g., a hole) through the separating wall 223, wherein the cord length is configurable to provide one user selectable installation option selected from a group consisting of:

an "outside cord option" wherein a portion of the cord length extends through the slot 222 to a position outside of a footprint of the body 104, and is configured and adapted to electrically connect to an first electrical article located outside of the footprint, and a "rear mount option" wherein a portion of the cord length is received in the rear cavity 224, and is configured and adapted to electrically connect to a second electrical article located inside of the footprint of the body.

In one "outside cord option" embodiment, the power cord 128 and an electrical plug 129 coupled to a terminal end thereof are configured and adapted to electrically connect to an electrical receptacle (e.g., electrical receptacle 506) that is located "outside of" a footprint of the body 104, wherein the power cord 128 is received through the slot 222 formed in the wall 104W of the body 104 as shown in FIG. 3 and FIG. 5A. Once the electrical plug 129 on the power cord 128 is plugged into the electrical receptacle 506 (FIG. 5B), the electric vehicle charging apparatus 100 may be hung on a mounting bracket or otherwise installed to the structure using tabs 435 (FIG. 4A).

In one "rear mount option" embodiment, the power cord 128 and the electrical plug 129 are received within the rear cavity 224 and are configured and adapted to electrically connect to an electrical receptacle 506 located inside of a footprint of the body 104, as is shown in FIG. 2 and FIG. 5A. In this particular "rear mount option," a portion of the cord length of the power cord 128 is configured and adapted to pass from the pass-through connector 220 through the rear cavity 224 and have the cord portion not within the front cavity 425 (FIG. 4A) be hidden entirely from view within the rear cavity 224. Thus, a clean-looking installation is provided. In this rear mount option, the electrical plug 129 may be connected to the electrical receptacle 540 and then the electric vehicle charging apparatus 100 may be hung on a mounting bracket as is described in US Patent Pub. No. 2013/002162.

Another possible "outside cord option" includes a "direct wire outside cord option" wherein the power cord 128 is adapted to electrically connect directly to a load center panel or sub-panel or to a gang box. In this outside cord option, the power cord 128 may be received through a conduit (e.g., a PVC or metal conduit) connectable to the wall 104W at the slot 222 of the body 104 and to the bottom, side, or top of a load center panel 501 or sub-panel, for example. Load center panel as used herein is any panel board or other box-like load center enclosure that holds circuit protection devices such as ground fault circuit interrupters (GFCIs), arc fault circuit interrupters (AFCI's), circuit breakers, and the like and which receive electrical power from a main power terminal such that it may be distributed to one or more branch circuits. "Sub-panel" as used herein is any panel or box-like enclosure connected electrically to a load center panel which itself includes one or more circuit protection devices such as ground fault circuit interrupters (GFCIs), arc fault circuit interrupters (AFCIs), circuit breakers, and the like and which receive electrical power from the main load center panel.

In another "rear mount option," the electric vehicle charging apparatus 100 may be installed with a "direct wire rear mount option" wherein the power cord 128 is configured and adapted to electrically connect through a gang box 542 (FIG. 5A) mounted within the footprint of the electric vehicle charging apparatus 100. In this embodiment, the power cord may be an electrical conduit (e.g., 10-3 cable) extending from the gang box 542 and may pass through the common passage in the separating wall 223 and be wired directly to the electrical terminal 430 as shown in FIG. 4A. However, in this installation, a pass-through connector 220 may be eliminated or a simple elastomer grommet may be slipped over the electrical conduit and used to seal the passage. For this direct wire rear mount option, the electric vehicle charging apparatus 100 may be hung on a mounting bracket so that the installer may have both hands free to strip, prepare, and connect the conductors of the electrical conduit emanating from the gang box 542 through the passageway in the separating wall 223 and to the electrical terminal 430.

Again referring to FIG. 2, in some embodiments, the rear cavity 224 includes one or more dividing walls 226 positioned on one or more sides of the charging cable 103 in the area between where the charging cable 103 exits the front cavity 425 into the rear cavity 224. In the depicted embodiment, the power cord 128 is spaced away from the charging cable 103 by the one or more dividing walls 226. As shown, in the rear mount option configuration, the power cord 128 passes out of the common pass through connector 220 and extends laterally across a bottom of the rear cavity 224 as shown and into a side portion 224S of the rear cavity 224 where the electrical receptacle 540 or gang box 542 would be located. In the depicted embodiment, the side portion 224S of the rear cavity 224 may be less deep than the bottom portion 224B including the common pass through connector 220 and the charge cable connector 227.

Figure 6:
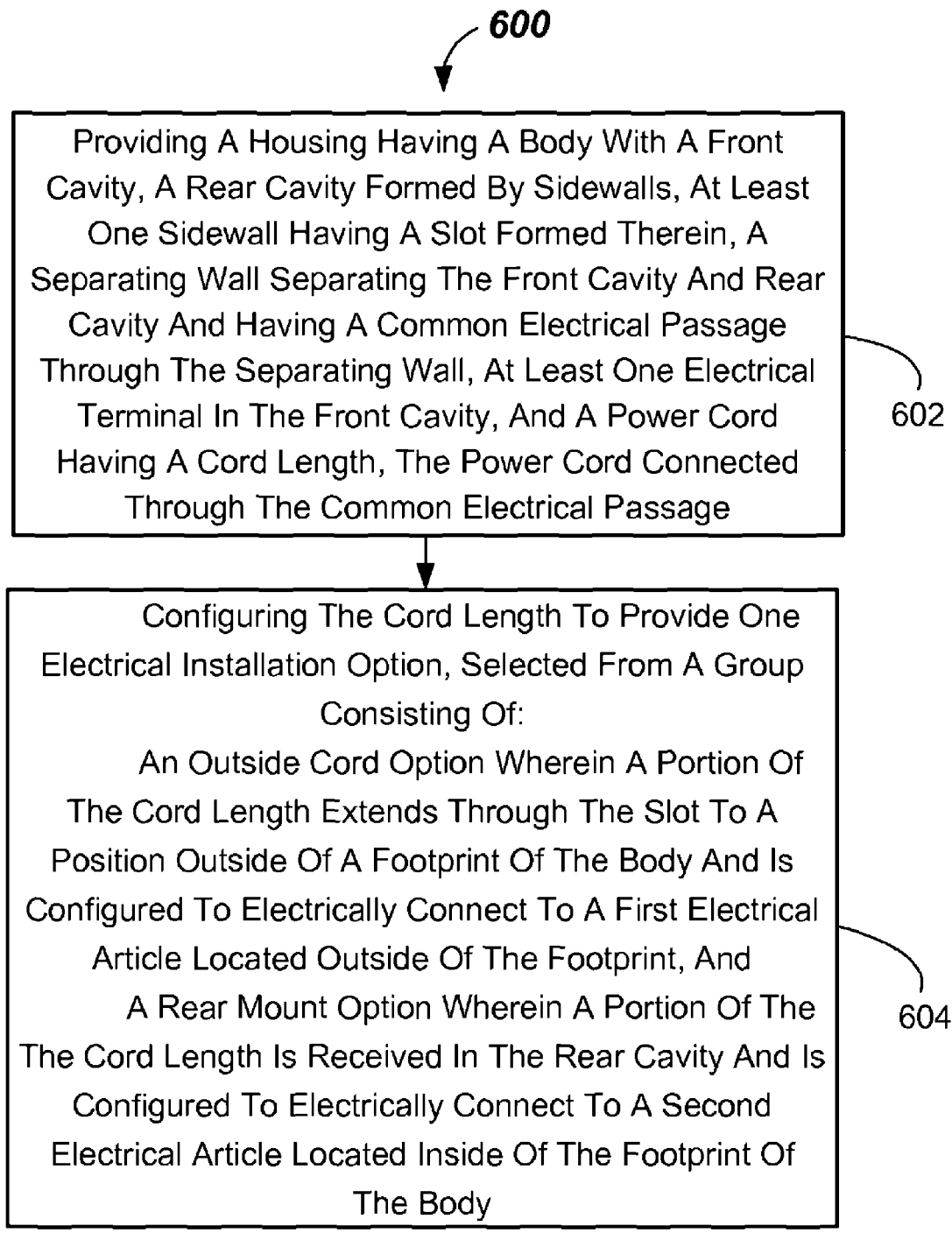
FIG. 6 is a flowchart of a method of configuring an electric vehicle charging apparatus according to embodiments.

A method of the invention will now be described with reference to FIG. 6. The method 600 of configuring an electric vehicle charging apparatus (e.g., electric vehicle charging apparatus 100) includes, in 602, providing a housing (e.g., housing 102) having a body (e.g., 104) with a front cavity (e.g., 425), a rear cavity (e.g., 224) formed by sidewalls (e.g., sidewalls 104S1 through 105S5), at least one sidewall having a slot (e.g., slot 222) formed therein, a separating wall (e.g., separating wall 223) separating the front cavity and the rear cavity and having a common wiring passage (e.g., common wiring passage 225) through the separating wall, at least one electrical terminal (e.g., 430) in the front cavity (e.g., 425), and a power cord (e.g., power cord 128) having a cord length, the power cord connected through the common electrical passage.

The method 600 includes, in 604, configuring the cord length to provide one electrical installation option consisting of an outside cord option (e.g., FIG. 3) wherein a portion of the cord length of the power cord (e.g., 128) extends through a slot (e.g., slot 222) to a position outside of a footprint of the body 104, and is configured to electrically connect to a first electrical article (e.g., a load center panel, subpanel, or gang box) located outside of a footprint of the body 104, or a rear mount option (e.g., FIG. 2) wherein a portion of the cord length of the power cord (e.g., 128) is received in the rear cavity (e.g., 224) and configured to electrically connect to a second electrical article (e.g., an electrical receptacle 540 or gang box 542) located inside of the footprint of the body 104. In the rear mount option, the electrical plug 129 and the power cord may be entirely hidden from view inside the rear cavity 224.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the scope of the invention.

What is claimed is:

1. An electric vehicle charging apparatus, comprising:
   a housing having a body having a front cavity having at least one electrical terminal, a rear cavity formed by sidewalls, at least one sidewall having a slot formed therein the slot including a slot opening at a terminal edge of the at least one sidewall, a separating wall separating the front cavity and rear cavity and having a common electrical passage through the separating wall; and
   a power cord having a cord length, the power cord connected through the common electrical passage, wherein the cord length is configurable to provide installation options including:
   an outside cord option wherein a portion of the cord length is received in the slot opening and extends from the rear cavity through the slot to a position outside of a footprint of the body and is adapted to electrically connect to an first electrical article located outside of the footprint, and
   a rear mount option wherein a portion of the cord length is received in the rear cavity and is adapted to electrically connect to a second electrical article located inside of the footprint of the body
   wherein the installation options are changeable between the outside cord option and the rear mount option without removing the power cord from the common electrical passage.

2. The electric vehicle charging apparatus of claim 1, wherein the first electrical article is selected from a group of an load center panel, a sub-panel, a gang box, and an electrical receptacle.

3. The electric vehicle charging apparatus of claim 1, wherein the second electrical article is selected from a group of a gang box and an electrical receptacle.

4. The electric vehicle charging apparatus of claim 1, comprising an electrical plug attached to the cord length.

5. The electric vehicle charging apparatus of claim 4, comprising:
   the outside cord option wherein a first portion of the cord length extends through the rear cavity, through the slot, and the electrical plug is adapted to electrically connect to an electrical receptacle located outside of the footprint of the body.

6. The electric vehicle charging apparatus of claim 4, comprising:
   the rear mount option wherein the cord length and the electrical plug are received in the rear cavity and are adapted to electrically connect to an electrical receptacle located inside of the footprint of the body.

7. The electric vehicle charging apparatus of claim 1, wherein the slot is positioned on a bottom sidewall of the body.

8. The electric vehicle charging apparatus of claim 7, wherein the slot is positioned adjacent to an exit through the lower sidewall of a charging cable.

9. The electric vehicle charging apparatus of claim 1, wherein the rear cavity includes dividing walls positioned on each side of a charging cable that is adapted to electrically connect to an electric vehicle.

10. The electric vehicle charging apparatus of claim 9, wherein a second portion of the cord length passing around the charging cable in the rear cavity is spaced from charging cable the by the dividing walls.

11. The electric vehicle charging apparatus of claim 1, wherein the common electrical passage includes an electrical connector.

12. The electric vehicle charging apparatus of claim 11, wherein the electrical connector comprises a sealed connector.

13. An electric vehicle charging apparatus, comprising:
a housing having a body with a front cavity, a rear cavity formed by sidewalls, wherein at least one of the sidewalls has a slot through, the slot including a slot opening at a terminal edge of the at least one of the sidewalls, a separating wall separating the front cavity having a common electrical passage, an electrical terminal in the front cavity;
a common electrical pass through connector received in the common electrical passage; and
a power cord having a cord length and an electrical plug at a terminal end, the power cord connected through the common electrical pass-through connector and electrically connected to the electrical terminal in the front cavity, wherein the cord length and electrical plug are configurable to provide a plurality of electrical installation options, selected from a group consisting of:
an outside cord option wherein a portion of the cord length is received in the slot opening at the terminal edge and passes from the rear cavity through the slot and the electrical plug is configured and adapted to electrically connect to an electrical receptacle located outside a footprint of the body, and
a rear mount option wherein the cord length and electrical plug are received in the rear cavity and are configured and adapted to electrically connect to an electrical receptacle located inside of the footprint of the body
wherein the plurality of electrical installation options are changeable between the outside cord option and the rear mount option without removing the power cord from the common electrical passage.

14. A method of configuring an electric vehicle charging apparatus, comprising:
providing a housing having a body with a front cavity, a rear cavity formed by sidewalls, at least one sidewall having a slot formed therein, the slot including a slot opening at a terminal edge of the at least one sidewall, a separating wall separating the front cavity and rear cavity and having a common electrical passage through the separating wall, at least one electrical terminal in the front cavity, and a power cord having a cord length, the power cord connected through the common electrical passage; and
configuring the cord length to provide an electrical installation option, selected from a group consisting of:
an outside cord option wherein a portion of the cord length is received in the slot opening at the terminal edge and extends from the rear cavity through the slot to a position outside of a footprint of the body and is configured to electrically connect to an first electrical article located outside of the footprint, and
a rear mount option wherein the cord length is received in the rear cavity and is configured to electrically connect to a second electrical article located inside of the footprint of the body
wherein the electrical installation option is changeable between the outside cord option and the rear mount option without removing the power cord from the common electrical passage.

15. The method of claim 14, comprising:
the outside cord option wherein the cord length and coupled electrical plug are configured to electrically connect to an electrical receptacle located outside of the footprint of the body.

16. The method of claim 14, comprising:
the rear mount option wherein the cord length and a coupled electrical plug are received in the rear cavity and are configured to electrically connect to an electrical receptacle located inside of the footprint of the body.

\* \* \* \* \*